US008990087B1

(12) United States Patent
Lattyak et al.

(10) Patent No.: US 8,990,087 B1
(45) Date of Patent: Mar. 24, 2015

(54) PROVIDING TEXT TO SPEECH FROM DIGITAL CONTENT ON AN ELECTRONIC DEVICE

(75) Inventors: John Lattyak, Los Gatos, CA (US); John T. Kim, La Canada, CA (US); Robert Wai-Chi Chu, Oakland, CA (US); Laurent An Minh Nguyen, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1091 days.

(21) Appl. No.: 12/242,394

(22) Filed: Sep. 30, 2008

(51) Int. Cl.
*G10L 15/00* (2013.01)

(52) U.S. Cl.
USPC ........... 704/251; 704/201; 704/258; 704/260; 704/266; 704/3; 706/11; 715/201; 715/203

(58) Field of Classification Search
USPC ............. 704/270, 272, 258–260, 201, 266, 3; 706/11; 715/201, 203
See application file for complete search history.

(56) References Cited

U.S. PATENT DOCUMENTS

| | | | | | |
|---|---|---|---|---|---|
| 4,931,950 | A | * | 6/1990 | Isle et al. | 706/11 |
| 4,985,697 | A | * | 1/1991 | Boulton | 715/203 |
| 5,761,682 | A | * | 6/1998 | Huffman et al. | 715/201 |
| 5,796,916 | A | * | 8/1998 | Meredith | 704/258 |
| 5,924,068 | A | * | 7/1999 | Richard et al. | 704/260 |
| 5,940,796 | A | * | 8/1999 | Matsumoto | 704/260 |
| 6,016,471 | A | * | 1/2000 | Kuhn et al. | 704/266 |
| 6,078,885 | A | * | 6/2000 | Beutnagel | 704/258 |
| 6,324,511 | B1 | * | 11/2001 | Kiraly et al. | 704/260 |
| 6,446,040 | B1 | * | 9/2002 | Socher et al. | 704/260 |
| 6,564,186 | B1 | * | 5/2003 | Kiraly et al. | 704/260 |
| 6,810,379 | B1 | * | 10/2004 | Vermeulen et al. | 704/260 |
| 6,985,864 | B2 | * | 1/2006 | Nagao | 704/260 |
| 7,191,131 | B1 | * | 3/2007 | Nagao | 704/258 |
| 7,260,533 | B2 | * | 8/2007 | Kamanaka | 704/260 |
| 7,292,980 | B1 | * | 11/2007 | August et al. | 704/254 |
| 7,299,182 | B2 | * | 11/2007 | Xie | 704/258 |
| 7,356,468 | B2 | * | 4/2008 | Webster | 704/258 |
| 7,401,286 | B1 | * | 7/2008 | Hendricks et al. | 715/203 |
| 7,483,832 | B2 | * | 1/2009 | Tischer | 704/260 |
| 7,487,093 | B2 | * | 2/2009 | Mutsuno et al. | 704/266 |
| 7,630,898 | B1 | * | 12/2009 | Davis et al. | 704/266 |
| 7,672,436 | B1 | * | 3/2010 | Thenthiruperai et al. | 379/88.04 |
| 7,693,716 | B1 | * | 4/2010 | Davis et al. | 704/260 |
| 7,742,919 | B1 | * | 6/2010 | Davis et al. | 704/260 |
| 7,849,393 | B1 | * | 12/2010 | Hendricks et al. | 715/203 |
| 7,865,365 | B2 | * | 1/2011 | Anglin et al. | 704/258 |
| 7,870,142 | B2 | * | 1/2011 | Michmerhuizen et al. | 707/755 |
| 8,027,835 | B2 | * | 9/2011 | Aizawa | 704/258 |
| 2002/0029146 | A1 | * | 3/2002 | Nir | 704/260 |
| 2002/0054073 | A1 | * | 5/2002 | Yuen | 345/727 |

(Continued)

OTHER PUBLICATIONS

Shiratuddin et al. "E-Book Technology and Its Potential Applications in Distance Education" 2003.*

(Continued)

*Primary Examiner* — Michael Colucci
(74) *Attorney, Agent, or Firm* — Lee & Hayes, PLLC

(57) ABSTRACT

A method for providing text to speech from digital content in an electronic device is described. Digital content including a plurality of words and a pronunciation database is received. Pronunciation instructions are determined for the word using the digital content. Audio or speech is played for the word using the pronunciation instructions. As a result, the method provides text to speech on the electronic device based on the digital content.

24 Claims, 8 Drawing Sheets

(56) References Cited

U.S. PATENT DOCUMENTS

| | | | | |
|---|---|---|---|---|
| 2003/0046076 | A1* | 3/2003 | Hirota et al. | 704/258 |
| 2003/0074196 | A1* | 4/2003 | Kamanaka | 704/260 |
| 2003/0191645 | A1* | 10/2003 | Zhou | 704/260 |
| 2003/0212559 | A1* | 11/2003 | Xie | 704/260 |
| 2004/0059577 | A1* | 3/2004 | Pickering | 704/260 |
| 2004/0158457 | A1* | 8/2004 | Veprek et al. | 704/201 |
| 2005/0071165 | A1* | 3/2005 | Hofstader et al. | 704/270.1 |
| 2005/0256716 | A1* | 11/2005 | Bangalore et al. | 704/260 |
| 2006/0041429 | A1* | 2/2006 | Amato et al. | 704/260 |
| 2006/0054689 | A1* | 3/2006 | Omino et al. | 235/380 |
| 2006/0069567 | A1* | 3/2006 | Tischer et al. | 704/260 |
| 2006/0074673 | A1* | 4/2006 | Chiu et al. | 704/260 |
| 2006/0277044 | A1* | 12/2006 | McKay | 704/260 |
| 2007/0239424 | A1* | 10/2007 | Payn | 704/3 |
| 2007/0239455 | A1* | 10/2007 | Groble et al. | 704/260 |
| 2007/0282607 | A1* | 12/2007 | Bond et al. | 704/260 |
| 2008/0059191 | A1* | 3/2008 | Huang et al. | 704/260 |
| 2008/0082316 | A1* | 4/2008 | Tsui et al. | 704/4 |
| 2008/0086307 | A1* | 4/2008 | Okayama et al. | 704/260 |
| 2008/0114599 | A1* | 5/2008 | Slotznick et al. | 704/260 |
| 2008/0140413 | A1* | 6/2008 | Millman et al. | 704/270 |
| 2008/0208574 | A1* | 8/2008 | Chen et al. | 704/221 |
| 2009/0006097 | A1* | 1/2009 | Etezadi et al. | 704/260 |
| 2009/0048821 | A1* | 2/2009 | Yam et al. | 704/3 |
| 2009/0094031 | A1* | 4/2009 | Tian et al. | 704/251 |
| 2009/0202226 | A1* | 8/2009 | McKay | 386/104 |
| 2009/0248421 | A1* | 10/2009 | Michaelis et al. | 704/276 |
| 2009/0298529 | A1* | 12/2009 | Mahajan | 455/550.1 |
| 2010/0036666 | A1* | 2/2010 | Ampunan et al. | 704/251 |

OTHER PUBLICATIONS

Kirschning et al. “Animated Agents and TTS for HTML Documents” 2005.*

Sproat et al. “A Markup Language for Text-to-Speech Synthesis” 1997.*

Xydas et al. “Text-to-Speech Scripting Interface for Appropriate Vocalisation of e-Texts” 2001.*

IBM Text-to-Speech API Reference Version 6.4.0. Mar. 2002.*

* cited by examiner

PROVIDING TEXT TO SPEECH FROM DIGITAL CONTENT ON AN ELECTRONIC DEVICE

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed or hear audio that is produced by the electronic device. Further, the user may instruct the device to display or play a specific piece of information stored on the electronic device. As such, benefits may be realized from improved systems and methods for interacting with an electronic device.

DETAILED DESCRIPTION

Figure 1:
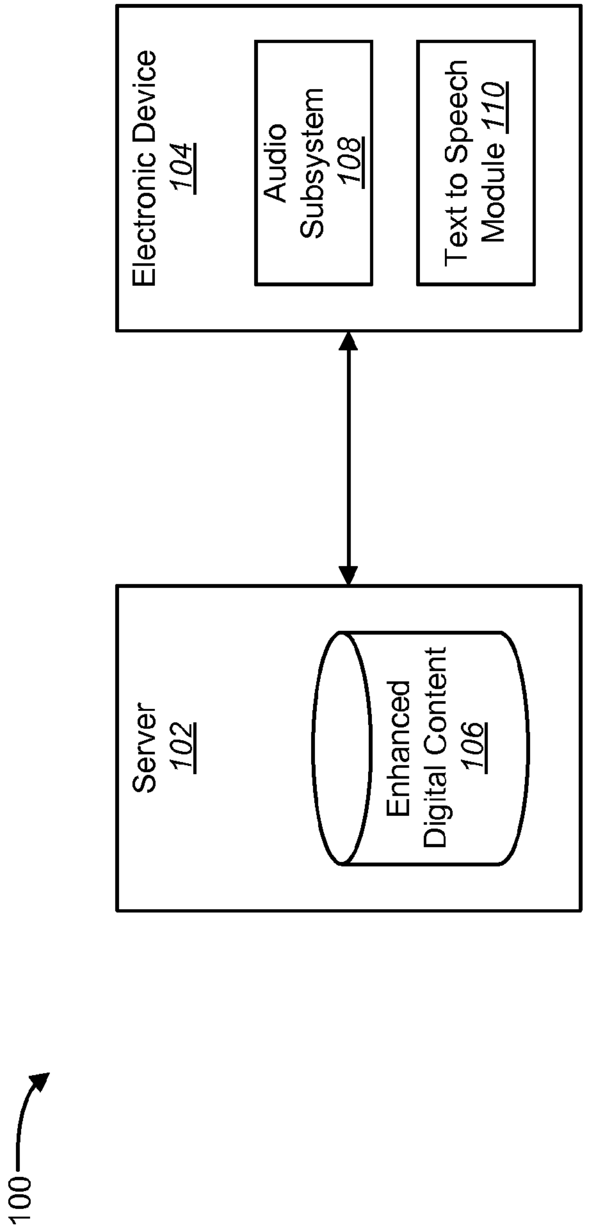
FIG. 1 is a block diagram illustrating a system for using a text to speech algorithm.

The present disclosure relates generally to digital media. Currently, digital text is available in a variety of forms. For example, publishers of printed materials frequently make digital media equivalents, known as e-books, available to their customers. E-books may be read on dedicated hardware devices known as e-book readers (or e-book devices), or on other types of computing devices, such as personal computers, laptop computers, personal digital assistants (PDAs), etc.

Under some circumstances, a person may want to listen to an e-book rather than read the e-book. For example, a person may be in a dark environment, may be fatigued from a large amount of reading, or may be involved in activity that makes reading more difficult or not possible. Additionally, publishers and authors may want to give their customers another, more dynamic, avenue to experience their works by listening to them. Despite these advantages, it may be expensive and impractical to record the reading of printed material. For example, a publisher might incur expenses associated with hiring someone to read aloud and professionals to record their material. Additionally, some printed materials, such as newspapers or other periodicals, may change weekly or even daily, thus requiring a significant commitment of resources.

The present disclosure relates to automatically synthesizing digital text into audio that can be played aloud. This synthesizing may be performed by a "text to speech" algorithm operating on a computing device. By automatically synthesizing text into audio, much of the cost and inconvenience of providing audio may be alleviated.

The techniques disclosed herein allow publishers to provide dynamic audio versions of their printed material in a seamless and convenient way while still maintaining their proprietary information. Text to speech software uses pronunciation database(s) to form the audio for each word in digital text. Additionally, text to speech software may use voice data to provide multiple "voices" in which the text may be read aloud.

The techniques disclosed herein allow a publisher to provide a supplemental pronunciation database for digital text, such as an e-book. This allows text to speech software, perhaps on an e-book reader, to produce audio with accurately pronounced words without a user having to separately install another pronunciation database. Accurate pronunciation might be especially important when listening to newspapers where many proper names are regularly used.

The techniques disclosed herein also allow a publisher to provide supplemental voice data in the same file as an e-book. This allows a publisher to specify different voices for different text within an e-book. For example, if a person decided to use text to speech software while reading a book, a male synthesized voice may read aloud the part of a male character while a female synthesized voice may read aloud the part of a female character. This may provide a more dynamic experience to a listener.

FIG. 1 is a block diagram illustrating a system 100 for using a text to speech algorithm 110 or module 110 (which may be referred to as the "TTS module"). In this system 100, a server 102 communicates with an electronic device 104. The server 102 may be any type of computing device capable of communicating with other electronic devices and storing enhanced digital content 106. Likewise, an electronic device 104 may be any computing device capable of communicating with a server 102. Some examples of electronic devices 104 include, but are not limited to, a personal computer, a laptop computer, a personal digital assistant, a mobile communications device, a smartphone, an electronic book (e-book) reader, a tablet computer, a set-top box, a game console, etc.

The enhanced digital content 106 resides on the server 102 and may include various kinds of electronic books (eBooks), electronic magazines, music files (e.g., MP3s), video files, etc. Electronic books ("eBooks") are digital works. The terms "eBook" and "digital work" are used synonymously and, as used herein, may include any type of content which may be stored and distributed in digital form. By way of illustration, without limitation, digital works and eBooks may include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

The enhanced digital content 106 is sent to the electronic device 104 and comprises multiple parts that will be discussed in detail below. The audio subsystem 108 resides on the electronic device 104 and is responsible for playing the output of the text to speech module 110 where appropriate. This may involve playing audio relating to the enhanced digital content. Additionally, the electronic device may include a visual subsystem (not shown) that may visually display text relating to the enhanced digital content. Furthermore, the electronic device may utilize both a visual subsystem and an audio subsystem for a given piece of enhanced digital content. For instance, a visual subsystem might display the text of an eBook on a screen for a user to view while the audio subsystem 108 may play a music file for the user to hear. Additionally, the text to speech module 110 converts text data in the enhanced digital content 106 into digital audio information. This digital audio information may be in any format known in the art. Thus, using the output of the TTS module 110, the audio subsystem 108 may play audio relating to text. In this way, the electronic device may "read" text as audio (audible speech). As used herein, the term "read" or "reading" means to audibly reproduce text to simulate a human reading the text out loud. Any method of converting text into audio known in the art may be used. Therefore, the electronic device 104 may display the text of an eBook while simultaneously playing the digital audio information being output by the text to speech module 110. The functionality of the text to speech module 110 will be discussed in further detail below.

Figure 2:
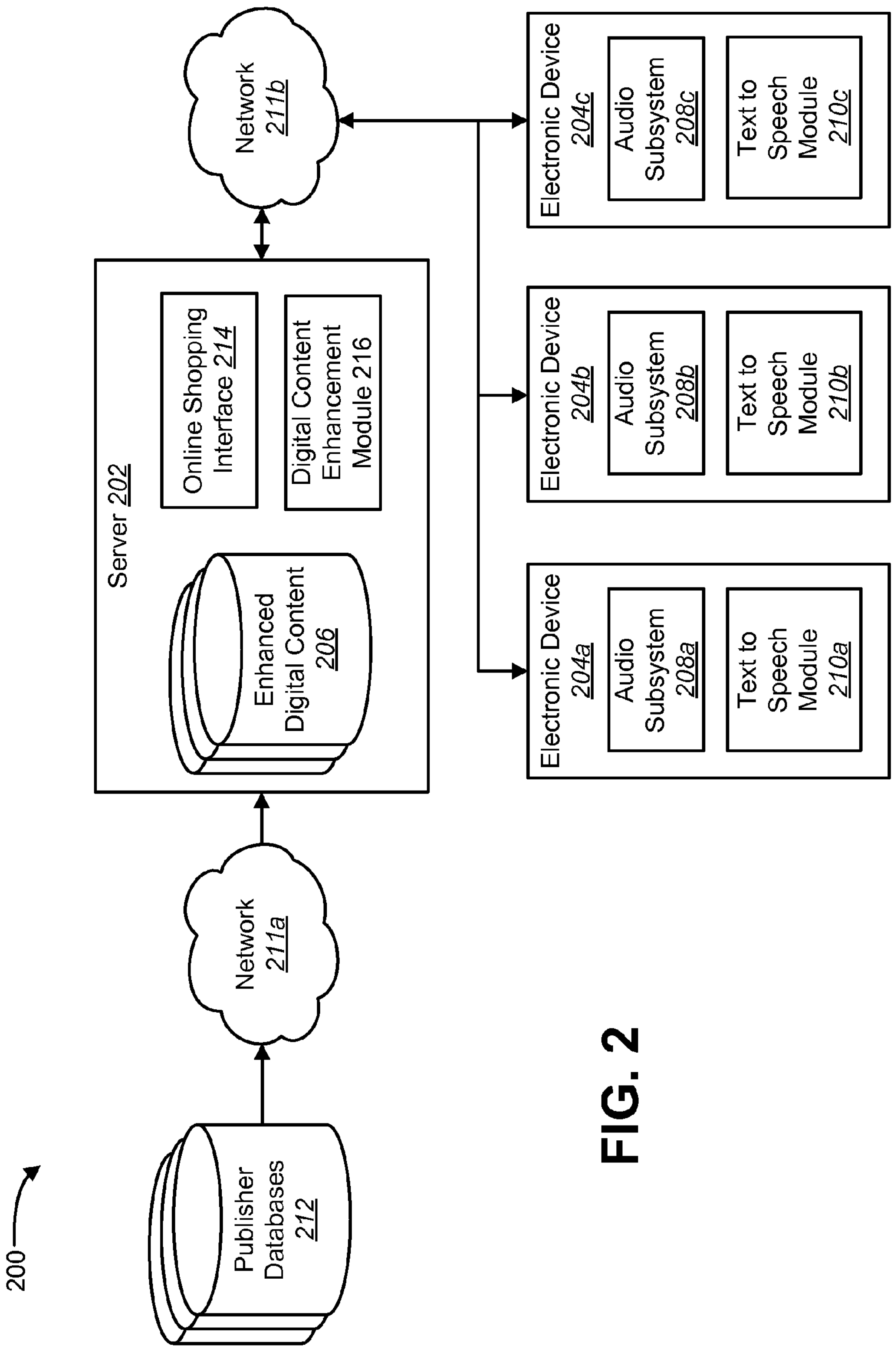
FIG. 2 is another block diagram illustrating a system for using a text to speech algorithm.

FIG. 2 is another block diagram illustrating a system for distributing enhanced digital content 206 for use by one or more text to speech algorithms 210 or modules 210. In this system 200, multiple publisher databases 212 may communicate with a server 202 through a network 211. In this configuration, the publisher databases 212 may send the enhanced digital content 206 to the server 202. The publisher databases 212 represent the publishers and/or creators of digital content and may transmit their content to the server 202 only once or periodically. For instance, a book publisher may send a particular eBook to the server 202 only once because the content of the book may not change, but a newspaper publisher may send its content every day, or multiple times a day, as the content changes frequently.

In addition to the enhanced digital content 206, the server 202 may include an online shopping interface 214 and a digital content enhancement module 216. The online shopping interface 214 may allow one more electronic devices 204 to communicate with the server 202 over a network 211, such as the internet, and to further interact with the enhanced digital content 206. This may involve a user of an electronic device 204 viewing, sampling, purchasing, or downloading the enhanced digital content 206. Online shopping interfaces may be implemented in any way known in the art, such as providing web pages viewable with an internet browser on the electronic device 204.

The digital content enhancement module 216 may be responsible for enhancing non-enhanced digital content (not shown in FIG. 2) that may reside on the server 202 before it is sent to the electronic devices 204 to be processed by the text to speech module 210, after which the audio subsystem 208 may play the digital audio information output by the text to speech module 210.

Figure 3:
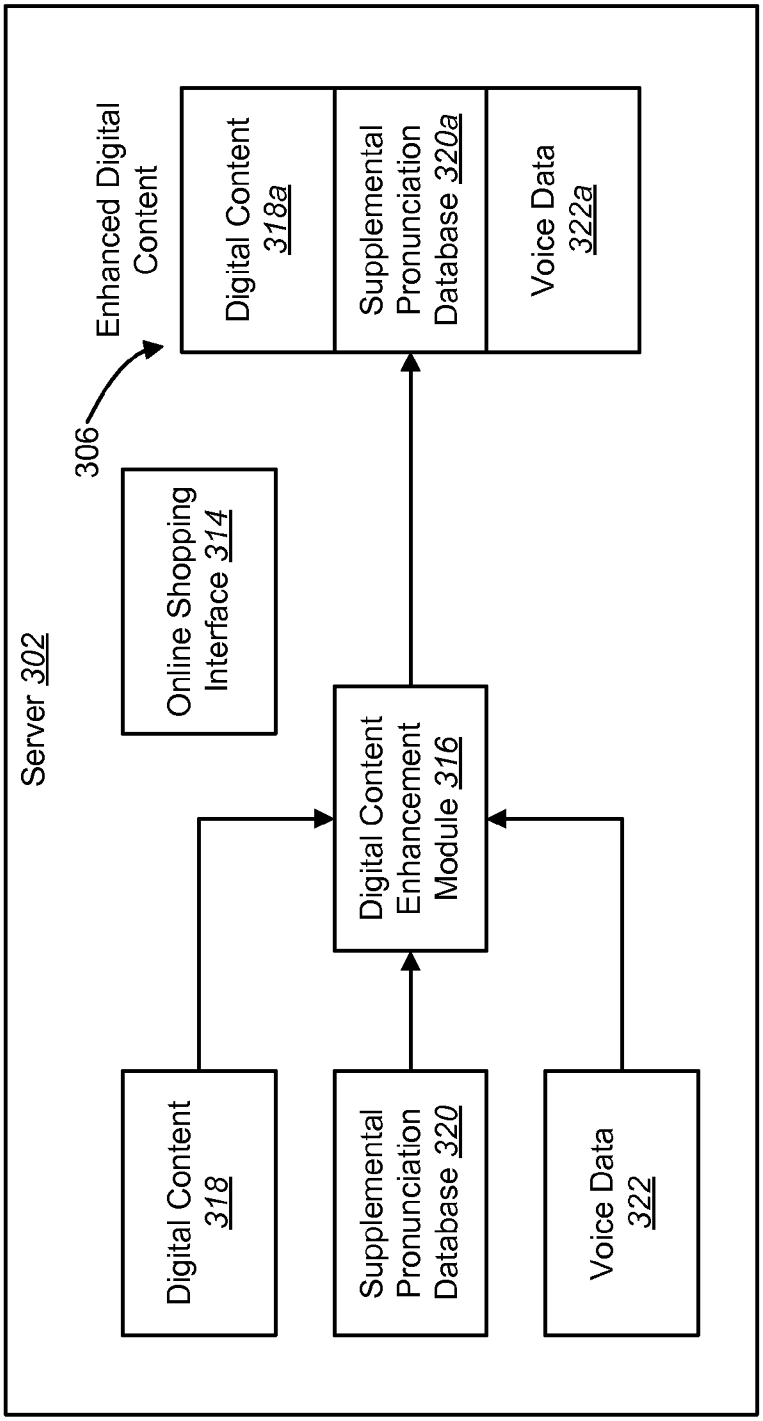
FIG. 3 is a block diagram illustrating an alternative configuration of a server that may be used to prepare enhanced digital content.

FIG. 3 is a block diagram illustrating an alternative configuration of a server 302 that may be used to prepare enhanced digital content 306. In this configuration, the digital content 318 from the publisher databases (not shown in FIG. 3) may be sent or provided to the server 302 without enhancement. The digital content enhancement module 316 may prepare or generate the enhanced digital content 306. Note that the server 302 may receive only enhanced, only non-enhanced, or some combination of both types of digital content from the publisher databases.

In the case of non-enhanced digital content 318, the digital content enhancement module 316 may combine the digital content 318 with a supplemental pronunciation database 320 and voice data 322 to form enhanced digital content 306. The digital content 318 itself may be the text of an eBook. It may be stored in any electronic format known in the art that is readable by an electronic device. The supplemental database 320 is a set of data and/or instructions that may be used by a text to speech module or algorithm (not shown in FIG. 3) in an electronic device to form pronunciation instructions. Similarly, the voice data 322 may include voice instructions that may specify which simulated voice is to be used when reading words in the digital content 318. Alternatively, the voice data may include the voice information itself enabling a text to speech module to read text in a particular simulated voice.

Additionally, the voice data 322 may include instructions specifying which language to use when reading words in the digital content 318. This may utilize existing abilities on an electronic device 104 to translate or may simply read the digital content 318 that may be provided in multiple languages. The supplemental pronunciation 320 may also include pronunciation instructions for words in multiple languages.

Both the supplemental pronunciation database 320 and the voice data 322 may be associated with a defined set of digital content 318. In other words, the supplemental pronunciation database 320 may not be incorporated into the default pronunciation database on the electronic device 104 and the voice data 322 may not be applied to digital content outside a defined set of digital content. For instance, a book publisher may send a supplemental pronunciation database 320 to the server 302 with pronunciation instructions for words in an eBook or series of eBooks that are not found in the default pronunciation database. Likewise, the voice data 322 may apply to one eBook or to a defined set of eBooks.

After the digital content enhancement module 316 combines the non-enhanced digital content 318, the supplemental pronunciation database 320, and the voice data 322 into a single enhanced digital content data structure 306, it is ready to be sent to an electronic device 104. In this configuration of enhanced digital content 306 shown in FIG. 3, the supplemental pronunciation database 320_a_ and the voice data 322_a_ are appended at the end of the digital content 318_a_.

Figure 4:
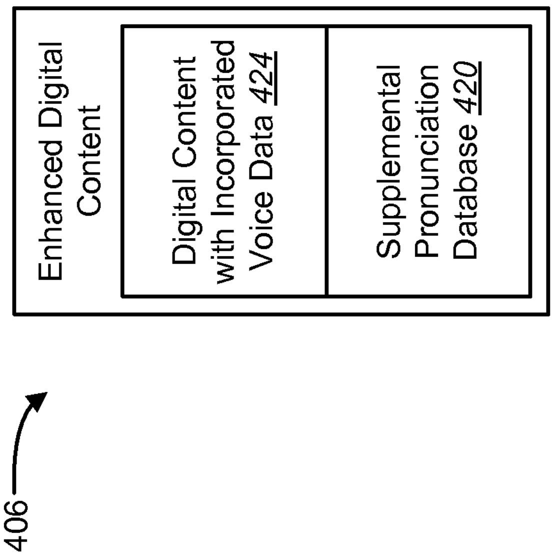
FIG. 4 is a block diagram of an alternative configuration of enhanced digital content.

FIG. 4 is a block diagram of an alternative configuration of enhanced digital content 406. The enhanced digital content 406 may be a container with digital content and other enhancements. In this embodiment the voice data is incorporated with the digital content 424. This may be done by adding voice parameters to HTML (HyperText Markup Language) tags within the digital content. As an example, the digital content 318 may include the following HTML before incorporating the voice data 322:

<p> "Hello Jim."</p>

<p> "How have you been, Sally?"</p>

<p> "Jim and Sally then talked about old times."</p>

After adding the voice data 322, the combined digital content with voice data 424 may include the following HTML:

<p voice="Sally">"Hello Jim"</p>

<p voice="Jim">"How have you been, Sally?"</p>

<p voice="Narrator">"Jim and Sally then talked about old times."</p>

In this way, the electronic device 104 may be able to read the different portions of the digital content with different simulated voices. For example, in the above example, "Hello Jim" might be read by a simulated female voice playing the part of "Sally," while "How have you been, Sally?" might be read by a simulated male voice playing the part of "Jim." There may be many different simulated voices available for a piece of enhanced digital content 406, including a default voice used when no other simulated voice is selected. The supplemental pronunciation database 420 may be appended to the digital content 424 in this configuration. Voices, or the voice information enabling a text to speech module 110 to read text in a particular simulated voice, may reside on the electronic device or may be included as part of the voice data.

Figure 5:
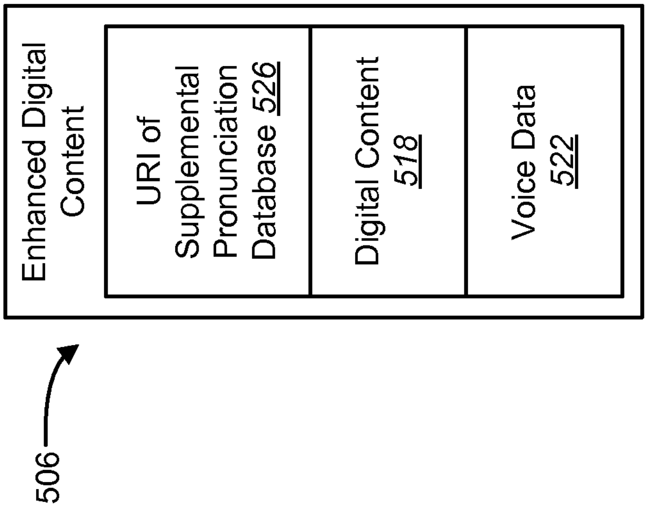
FIG. 5 is a block diagram of another alternative configuration of enhanced digital content.

FIG. 5 is a block diagram of another alternative configuration of enhanced digital content 506. Again, the enhanced digital content 506 may be a container with digital content and other enhancements. Here, however, rather than appending the supplemental pronunciation database to the end of the digital content 518, a Uniform Resource Identifier (URI) of a supplemental pronunciation database 526 may be prepended to the digital content 518. An electronic device 104 may then download this supplemental pronunciation database 320, which may reside on the server 302 or another location accessible to the electronic device 104, using the URI 526. Then, each subsequent time that an electronic device 104 receives enhanced digital content 506 with the same URI 526, it may not need to download the same supplemental pronunciation database 320 again. This allows more than one piece of digital content 518 to access a particular supplemental pronunciation database 320 without having to repeatedly download it. Also, if a user does not utilize the text to speech functionality, the enhanced digital content may be smaller in this configuration since the supplemental pronunciation database 320 may not be downloaded until a user indicates that they would like to use this functionality. Alternatively, the supplemental database 320 may be downloaded for each piece of enhanced digital content 506 received regardless of the functionality utilized by a user of the electronic device 104. Alternatively still, the device 104 may not download but simply access the database 320 via the URI 526 when needed. In addition, the voice data 522 may be separate and distinct from the digital content 518 in this configuration. Alternatively, the enhanced digital content 506 may not include voice data 522.

Portions from the enhanced digital content 306, 406, 506 configurations herein may be combined in any suitable way. The various configurations are meant as illustrative only, and should not be construed as limiting the way in which enhanced digital content may be constructed.

Figure 6:
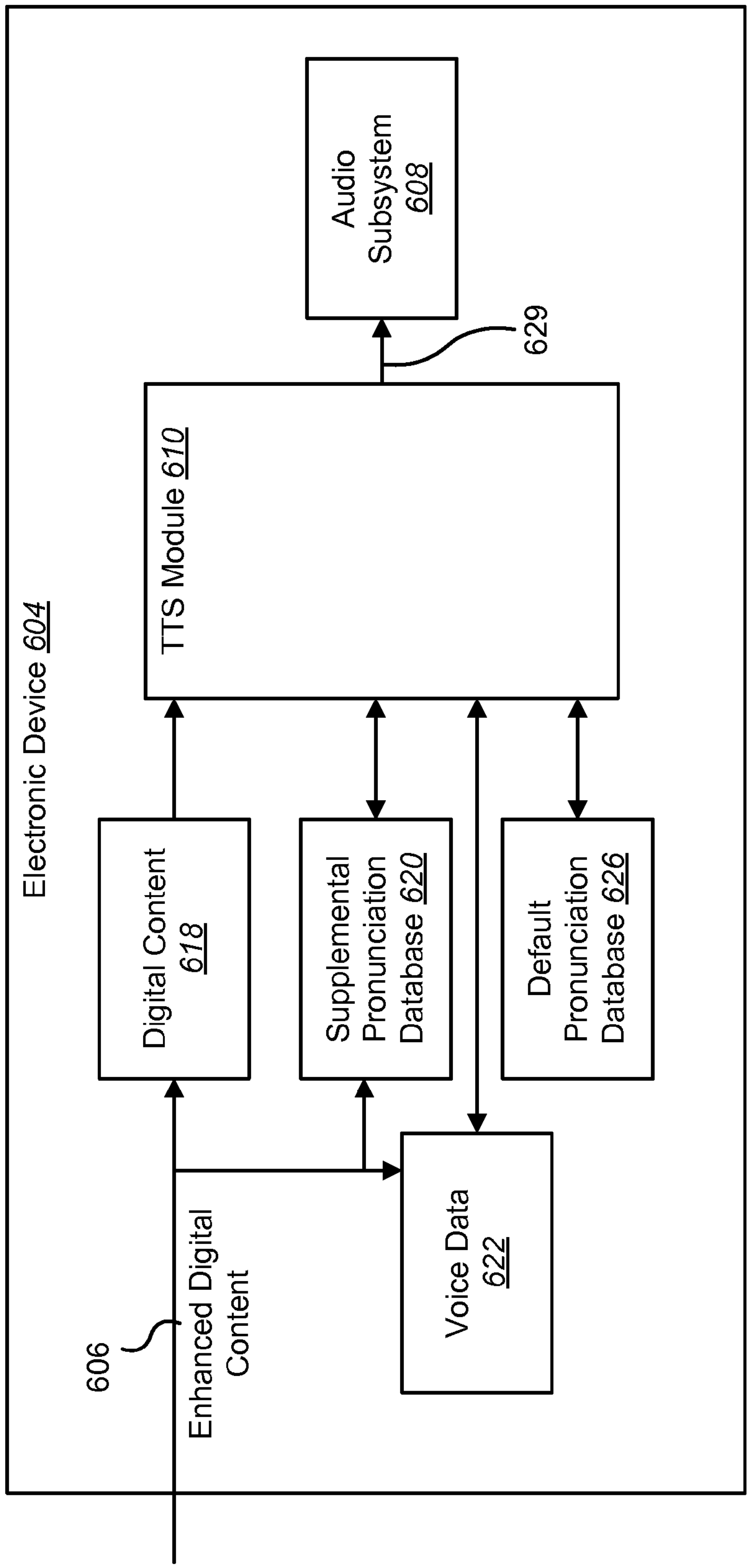
FIG. 6 is a block diagram illustrating an electronic device implementing a text to speech algorithm.

FIG. 6 is a block diagram illustrating an electronic device 604 implementing a text to speech algorithm. Enhanced digital content 606 is first received. This may be in response to a user of the electronic device 604 interacting with an online shopping interface 214 residing on the server 202. As an example, a user of an eBook reader might purchase an eBook from a server 202 and then receive the eBook in the form of enhanced digital content 606. The different components of the enhanced digital content 606 (digital content 618, supplemental pronunciation database 620, and voice data 622) are shown in this configuration as distinct blocks, although they may be maintained as the same data structure within the electronic device 604. Alternatively, the voice data 622 may be incorporated with the digital content 618 or not present as discussed above. Likewise, the enhanced digital content 606 may include a URI 526 to a supplemental pronunciation database 620 rather than the actual data itself.

The electronic device 604 may also include a default pronunciation database 626. The default pronunciation database 626 may include pronunciation instructions for a standard set of words and may reside on the electronic device 604. For instance, the default pronunciation database 626 may have a scope that is co-extensive with a dictionary. As spoken languages evolve to add new words and proper names, the default pronunciation database 626 may not include every word in a given piece of digital content 618. It is an attempt to cover most of the words that are likely to be in a given piece of digital content 618, recognizing that it may be difficult and impractical to maintain a single complete database with every word or name that may appear in a publication. On the other hand, the supplemental pronunciation database 620 may not have the breadth of the default pronunciation database 626, but it is tailored specifically for a given individual or set of digital content 618. In other words, the supplemental database 620 may be used to fill in the gaps of the default database 626.

One approach to the problem of an outdated default pronunciation database 626 has been to periodically provide updates to the default pronunciation database 626. This traditional method, though, is inconvenient since it requires the user of a device to install these updates. Additionally, this approach assimilates the update into the default pronunciation database 626 and applies it to all digital content.

However, in addition to being more efficient, a system utilizing both a default 626 and supplemental pronunciation database 620 may better maintain proprietary information. For instance, if newspaper publisher A has accumulated a wealth of pronunciation instructions for words or names relating to national politics and publisher A does not want to share that data with competitors, the system described herein may allow an electronic device 604 to use this data while reading digital content from publisher A, because the supplemental pronunciation database 620 was sent with the digital content. However, the proprietary pronunciation instructions may not be used when reading digital content from other sources since the supplemental 620 and default 626 pronunciation databases are not comingled.

The electronic device 604 may also include a text to speech module 610 that allows the device 604 to read digital content as audio. Any TTS module 610 known in the art may be used. Examples of TTS modules 610 include, without limitation, VoiceText by NeoSpeech and Vocalizer by Nuance. A TTS module 610 may be any module that generates synthesized speech from a given input text. The TTS module 610 may be able to read text in one or more synthesized voices and/or languages. Additionally, the TTS module 610 may use a default pronunciation database 626 to generate the synthesized speech. This default pronunciation database 626 may be customizable, meaning that a user may modify the database 626 to allow the TTS module 610 to more accurately synthesize speech for a broader range of words than before the modification.

The text to speech module 610 may determine the synthesized voice and the pronunciation for a given word. The TTS module 610 may access the supplemental database 620 for pronunciation instructions for the word, and the default database 626 if the word is not in the supplemental database 620. Additionally, the TTS module 610 may access the voice data 622 to determine voice instructions, or which simulated voice should be used. The output of the TTS module 610 may include digital audio information 629. In other words, the TTS module 610 may construct a digital audio signal that may then be played by the audio subsystem 608. Examples of formats of the digital audio information may include, without limitation, Waveform audio format (WAV), MPEG-1 Audio Layer 3 (MP3), Advanced Audio Coding (AAC), or Pulse-Code Modulation (PCM). This digital audio information may be constructed in the TTS module 610 using the pronunciation instructions and voice instructions for a word included in the digital content 618.

The audio subsystem 608 may have additional functionality. For instance, the audio subsystem 608 may audibly warn a user when the battery power for the electronic device 604 is low. Alternatively, the electronic device may have a visual subsystem (not shown) that may give a user some visual indication on a display, like highlighting, correlating to the word currently being read aloud. In the configuration shown, the text to speech module 610 may determine the words to retrieve to be read aloud, based on some order within the digital content, for instance sequentially through an eBook. Alternatively, the electronic device 604 may have a user interface that allows a user to select specific words from a display to be read aloud out of sequence. Furthermore, a user interface on an electronic device 604 may have controls to allow a user to pause, speed up, slow down, repeat, or skip the playing of audio.

Figure 7:
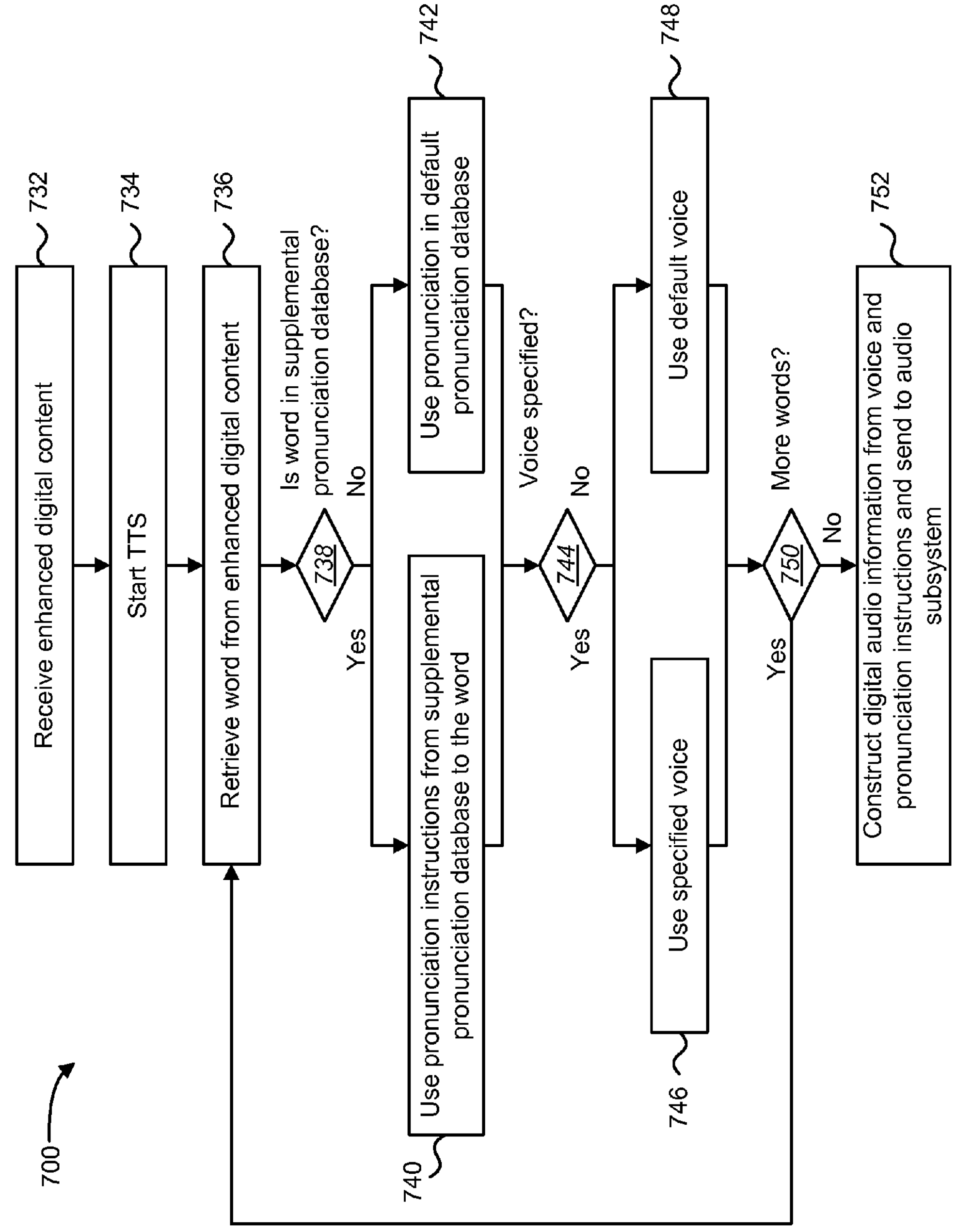
FIG. 7 is a flow diagram illustrating one configuration of a method for determining pronunciation instructions and voice instructions for a word using a text to speech algorithm.

FIG. 7 is a flow diagram illustrating one configuration of a method 700 for determining pronunciation instructions and voice instructions for a word using a text to speech algorithm. First, an electronic device 104 may receive 732 enhanced digital content 606. As discussed previously, the enhanced digital content 606 may be formatted in any way known in the art. Next, the electronic device 104 may start 734 the text to speech module 610, which may retrieve 736 a word from the enhanced digital content 606. The text to speech module 610 then determines 738 if pronunciation instructions for the word are in a supplemental pronunciation database 620. The supplemental pronunciation database 620 may have been downloaded as part of the enhanced digital content 606, may have been downloaded using a URI 526 stored as part of the enhanced digital content 606, or may otherwise reside on the device. Alternatively, the supplemental pronunciation database 620 may not reside on the electronic device 104 at all, but rather may simply be accessed by the electronic device 104. If pronunciation instructions for the word are found in the supplemental pronunciation database 620, those pronunciation instructions may be used 740 with the word. If there are no pronunciation instructions for the word in the supplemental pronunciation database 620, the pronunciation instructions for the word found in the default pronunciation database 626 may be used 742.

Next the TTS module 610 may determine 744 if a voice is specified for the same word in the enhanced digital content 606. If yes, the specified simulated voice may be used 746 with the word. If there is no specified simulated voice for the word, a default simulated voice may be used 748 with the word. The TTS module 610 may then determine 750 if there are more words in the enhanced digital content 606 waiting to be read. If yes, the TTS module 610 may retrieve 736 the next word and repeat the accompanying steps as shown in FIG. 7. If there are no more words to be read, the TTS module 610 may construct 752 digital audio information from the words, the pronunciation instructions, and voice instructions and send the digital audio information to the audio subsystem to be played. In the configuration shown, the TTS module 610 may construct 752 the digital audio information of each word to be read before sending it to the audio subsystem 608. Alternatively, the TTS module 610 may construct and send the digital audio information on an individual word basis, rather than constructing the digital audio information including all the words before sending.

Figure 8:
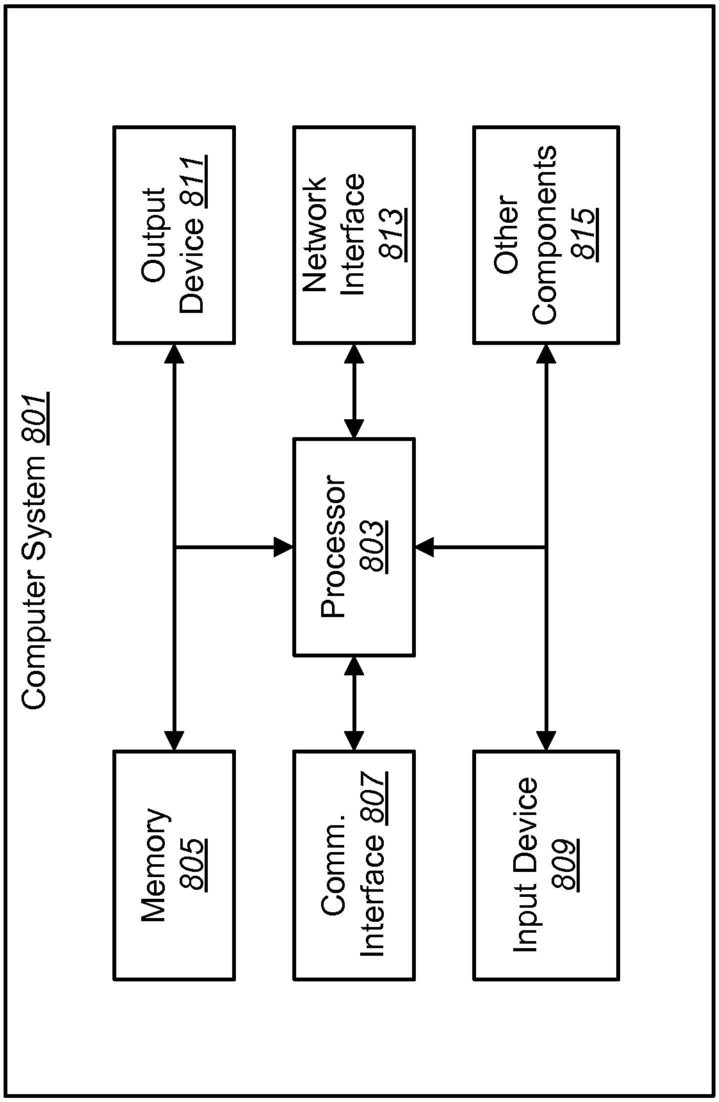
FIG. 8 illustrates various components that may be utilized in a computer system.

FIG. 8 illustrates various components that may be utilized in a computer system 801. One or more computer systems 801 may be used to implement the various systems and methods disclosed herein. For example, a computer system 801 may be used to implement a server 102 or an electronic device 104. The illustrated components may be located within the same physical structure or in separate housings or structures. Thus, the term computer or computer system 801 is used to mean one or more broadly defined computing devices unless it is expressly stated otherwise. Computing devices include the broad range of digital computers including microcontrollers, hand-held computers, personal computers, servers 102, mainframes, supercomputers, minicomputers, workstations, and any variation or related device thereof.

The computer system 801 is shown with a processor 803 and memory 805. The processor 803 may control the operation of the computer system 801 and may be embodied as a microprocessor, a microcontroller, a digital signal processor (DSP) or other device known in the art. The processor 803 typically performs logical and arithmetic operations based on program instructions stored within the memory 805. The instructions in the memory 805 may be executable to implement the methods described herein.

The computer system 801 may also include one or more communication interfaces 807 and/or network interfaces 813 for communicating with other electronic devices. The communication interface(s) 807 and the network interface(s) 813 may be based on wired communication technology, wireless communication technology, or both.

The computer system 801 may also include one or more input devices 809 and one or more output devices 811. The input devices 809 and output devices 811 may facilitate user input. Other components 815 may also be provided as part of the computer system 801.

FIG. 8 illustrates only one possible configuration of a computer system 801. Various other architectures and components may be utilized.

Figure 9:
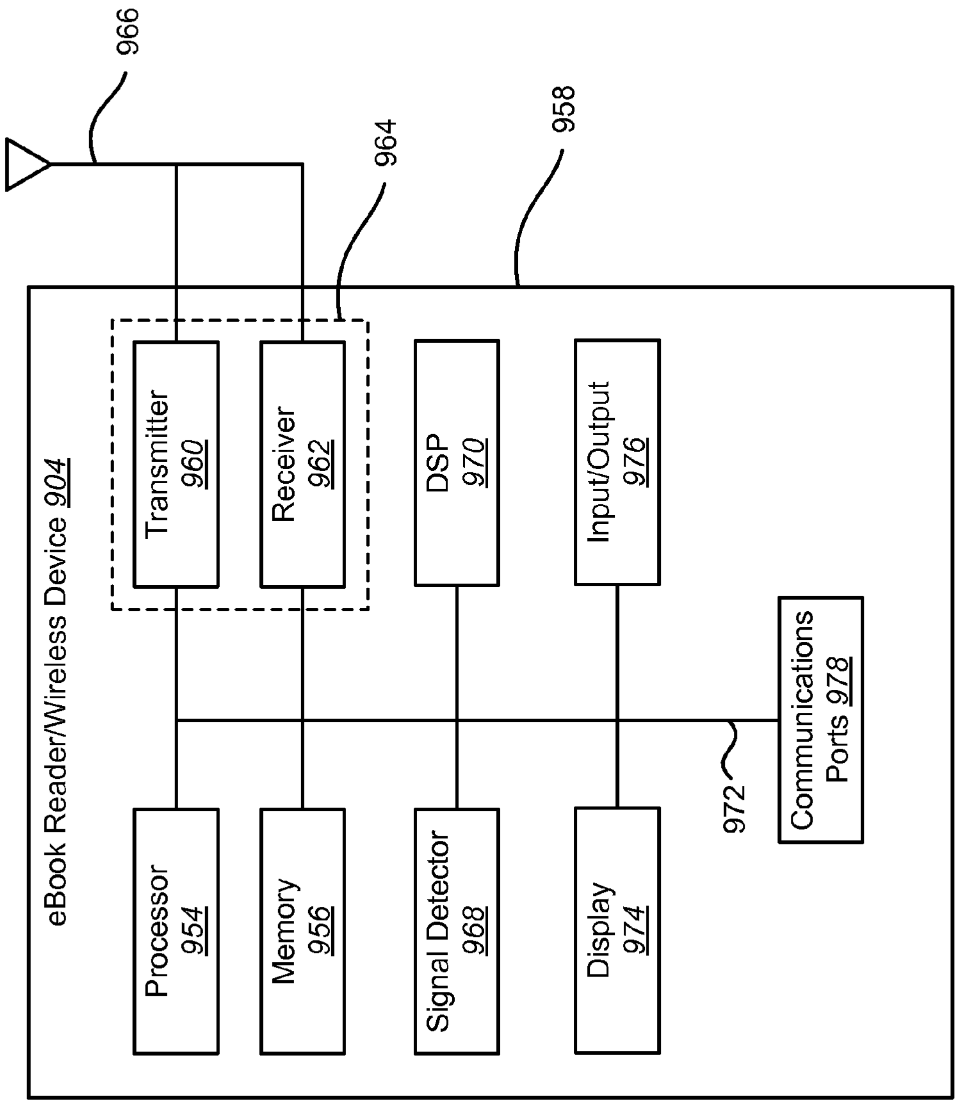
FIG. 9 illustrates various components that may be utilized in an eBook reader/wireless device.

FIG. 9 illustrates various components that may be utilized in one configuration of an electronic device 104. One configuration of an electronic device 104 may be an eBook reader/wireless device 904.

The wireless device 904 may include a processor 954 which controls operation of the wireless device 904. The processor 954 may also be referred to as a central processing unit (CPU). Memory 956, which may include both read-only memory (ROM) and random access memory (RAM), provides instructions and data to the processor 954. A portion of the memory 956 may also include non-volatile random access memory (NVRAM). The processor 954 typically performs logical and arithmetic operations based on program instructions stored within the memory 956. The instructions in the memory 956 may be executable to implement the methods described herein.

The wireless device 904 may also include a housing 958 that may include a transmitter 960 and a receiver 962 to allow transmission and reception of data between the wireless device 904 and a remote location. The transmitter 960 and receiver 962 may be combined into a transceiver 964. An antenna 966 may be attached to the housing 958 and electrically coupled to the transceiver 964. The wireless device 904 may also include (not shown) multiple transmitters, multiple receivers, multiple transceivers and/or multiple antenna.

The wireless device 904 may also include a signal detector 968 that may be used to detect and quantify the level of signals received by the transceiver 964. The signal detector 968 may detect such signals as total energy, pilot energy per pseudonoise (PN) chips, power spectral density, and other signals. The wireless device 904 may also include a digital signal processor (DSP) 970 for use in processing signals.

The wireless device 904 may also include one or more communication ports 978. Such communication ports 978 may allow direct wired connections to be easily made with the device 904.

Additionally, input/output components 976 may be included with the device 904 for various input and output to and from the device 904. Examples of different kinds of input components include a keyboard, keypad, mouse, microphone, remote control device, buttons, joystick, trackball, touchpad, lightpen, etc. Examples of different kinds of output components include a speaker, printer, etc. One specific type of output component is a display 974.

The various components of the wireless device 904 may be coupled together by a bus system 972 which may include a power bus, a control signal bus, and a status signal bus in addition to a data bus. However, for the sake of clarity, the various busses are illustrated in FIG. 9 as the bus system 972.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing audio relating to digital content in an electronic device, comprising:

receiving digital content comprising a plurality of words and a supplemental pronunciation database of specified pronunciations for a portion of the plurality of words;

determining supplemental pronunciation instructions for a word of the plurality of words based at least in part on the supplemental pronunciation database;

determining default pronunciation instructions for another word of the plurality of words based at least in part on default pronunciation instructions in a default pronunciation database accessible by the electronic device;

determining that specified voice information used for synthesizing speech in a specified voice is specified for one or more of the plurality of words, wherein default voice information is used for synthesizing speech in a default voice in the absence of specified voice information; and synthesizing speech for the plurality of words using the supplemental pronunciation instructions, the default pronunciation instructions, and at least one of the specified voice or the default voice.

2. The method of claim 1, wherein the specified voice information used to generate the specified voice is appended to the digital content and is included in the data structure with the digital content and the supplemental pronunciation database.

3. The method of claim 2, wherein the specified voice information comprises parameters within hypertext markup language tags (HTML) in the digital content.

4. The method of claim 1, further comprising determining that the specified voice is not specified for one or more of the plurality of words and synthesizing speech based at least in part on the default voice information.

5. The method of claim 1, wherein the supplemental pronunciation database is used with the digital content received together with the supplemental pronunciation database and not with other digital content.

6. The method of claim 1, wherein the default pronunciation database is stored in local memory of the electronic device.

7. The method of claim 1, wherein the default voice information is stored in local memory of the electronic device.

8. An electronic device that is configured to provide audio relating to digital content, the electronic device comprising:

a default pronunciation database; and instructions stored in memory, the instructions being executable to:

receive digital content comprising a plurality of words and a supplemental pronunciation database that provides pronunciations for one or more of the plurality of words, wherein the supplemental pronunciation database is used with the digital content received in a same data structure as the supplemental pronunciation database and not with other digital content;

for a first word for which the supplemental pronunciation database includes pronunciation instructions, synthesize a first speech for the first word based at least in part on the pronunciation instructions in the supplemental pronunciation database;

for a second word for which the supplemental pronunciation database lacks pronunciation instructions, synthesize a second speech for the second word based at least in part on pronunciation instructions in the default pronunciation database;

for a third word for which a specified voice is specified, synthesize a third speech for the third word based at least in part on the specified voice; and for a fourth word for which a specified voice is not specified, synthesize a fourth speech for the fourth word based at least in part on a default voice.

9. The electronic device of claim 8, wherein the electronic device comprises an electronic book (eBook) reader device including wireless communication functionality.

10. The electronic device of claim 8, wherein the digital content and the supplemental pronunciation database are included within a single data structure.

11. A server configured to enhance digital content, comprising:

a database of digital content, wherein the digital content comprises a digital content item having a plurality of words;

a default pronunciation database comprising default pronunciation instructions for synthesizing speech;

specified voice information for synthesizing speech based at least in part on a specified voice;

a supplemental pronunciation database comprising pronunciation instructions for synthesizing speech for one or more of the plurality of words, wherein the pronunciation instructions are different from the default pronunciation instructions; and a digital content enhancement module configured to generate enhanced digital content by appending the supplemental pronunciation database and the specified voice information to the digital content in a same data structure, such that sending of the enhanced digital content to a computing device causes the computing device to:

synthesize a first speech based at least in part on the supplemental pronunciation database for a first one of the one or more of the plurality of words which have pronunciations in the supplemental pronunciation database;

synthesize a second speech based at least in part on a default pronunciation database for a second one of the one or more of the plurality of words which do not have pronunciations in the supplemental pronunciation database;

synthesize a third speech based at least in part on the specified voice for a third one of the one or more of the plurality of words which are specified to be synthesized with the specified voice; and synthesize a fourth speech based at least in part on a default voice for a fourth one of the one or more of the plurality of words for which a voice is not specified.

12. The server of claim 11, wherein the enhanced digital content comprises a single digital content data structure.

13. A non-transitory computer-readable medium comprising executable instructions for:

receiving an electronic book comprising a plurality of words, a supplemental pronunciation database, and a specified voice;

for a first word in the plurality of words that has pronunciation instructions included in the supplemental pronunciation database, synthesizing a first speech for the first word based at least in part on the pronunciation instructions from the supplemental pronunciation database;

for a second word in the plurality of words that does not have pronunciation instructions included in the supplemental pronunciation database, synthesizing a second speech for the second word based at least in part on a default pronunciation database;

for a third word in the plurality of words that is specified to be synthesized with the specified voice, synthesizing a third speech for the third word based at least in part on the specified voice; and for a fourth word in the plurality of words that is not specified to be synthesized with the specified voice, synthesizing a fourth speech for the fourth word based at least in part on a default voice.

14. The non-transitory computer-readable medium of claim 13, wherein the supplemental pronunciation database, the specified voice, and the eBook are included in a single digital content data structure.

15. The non-transitory computer-readable medium of claim 13, wherein the executable instructions further comprise instructions for:

limiting use of the supplemental pronunciation database to the eBook to which the supplemental pronunciation database is appended.

16. The non-transitory computer-readable medium of claim 13, wherein the supplemental pronunciation database and the specified voice are appended to the eBook.

17. A method for obtaining and rendering audio based on text in an electronic book (eBook), the method comprising:

sending, from an eBook reader device, a request to download the eBook;

receiving, at the eBook reader device, the eBook, a supplemental pronunciation database, and specified voice information for synthesizing speech in a specified voice;

synthesizing a first speech for a first portion of text in the eBook based at least in part on a pronunciation from the supplemental pronunciation database for portions of text which have pronunciations in the supplemental pronunciation database;

synthesizing a second speech for a second portion of text in the eBook based at least in part on a pronunciation from a default pronunciation database for portions of text which do not have pronunciations in the supplemental pronunciation database;

synthesizing a third speech for a third portion of text in the eBook based at least in part on the specified voice for portions of text which are specified to be synthesized with the specified voice; and synthesizing a fourth speech for a fourth portion of text based at least in part on a default voice for portions of text which do not have any specified voice.

18. The method of claim 17, wherein the supplemental pronunciation database is restricted to be used with the eBook and not with at least one other eBook.

19. The method of claim 17, wherein the supplemental pronunciation database is exclusive to at least one of the eBook, a category of eBooks to which the eBook belongs to, or a publisher associated with the eBook.

20. The method of claim 17, wherein the supplemental pronunciation database is appended to the eBook in a same data structure.

21. The method of claim 17, wherein the default pronunciation database is stored on the eBook reader device.

22. The method of claim 20, wherein the supplemental pronunciation database is used by the eBook received in the same data structure as the supplemental pronunciation database and not with other eBooks.

23. The method of claim 17, wherein the supplemental pronunciation database is generated based at least in part on content of the eBook.

24. The method of claim 17, further comprising storing the eBook, the supplemental pronunciation database, and the specified voice information on the eBook reader device.

* * * * *